(12) United States Patent
Ozaki

(10) Patent No.: US 7,045,804 B2
(45) Date of Patent: May 16, 2006

(54) IMAGE RECORDING MEDIUM HOLDING MECHANISM

(75) Inventor: Yuichi Ozaki, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 69 days.

(21) Appl. No.: 10/927,009

(22) Filed: Aug. 27, 2004

(65) Prior Publication Data

US 2005/0045838 A1   Mar. 3, 2005

(30) Foreign Application Priority Data

Aug. 29, 2003   (JP)   ............... 2003-306535

(51) Int. Cl.
*G03B 42/08*   (2006.01)

(52) U.S. Cl. ............... 250/580; 250/581; 250/582

(58) Field of Classification Search ............... 250/580
See application file for complete search history.

(56) References Cited

U.S. PATENT DOCUMENTS 6,897,453 B1*   5/2005   Stahl et al. ............... 250/472.1
2004/0089826 A1*   5/2004   Yonekawa ............... 250/584

FOREIGN PATENT DOCUMENTS

JP   2003-163092 A   6/2003

* cited by examiner

*Primary Examiner*—David Porta
*Assistant Examiner*—Marcus Taningco
(74) *Attorney, Agent, or Firm*—Sughrue Mion, PLLC

(57) ABSTRACT

After bearing members engage in respective recesses defined in engaging members that are fixed to sides of a stimulable phosphor sheet, openings of the recesses are closed by pressers of leaf springs, holding the stimulable phosphor sheet on the bearing members.

8 Claims, 8 Drawing Sheets

IMAGE RECORDING MEDIUM HOLDING MECHANISM

BACKGROUND OF THE INVENTION

1. Field of the Invention

The present invention relates to a holding mechanism for holding an image recording medium which is to be removably stored in an image processing apparatus.

2. Description of the Related Art

There is known a radiation image information recording and reading apparatus in which the radiation image information of a subject is recorded on a stimulable phosphor sheet positioned in a recording position, and thereafter stimulating light is applied in a main direction to the stimulable phosphor sheet and light emitted from the stimulable phosphor sheet in response to the applied stimulating light is read by a reading unit that moves in a direction substantially perpendicular to the main direction (see Japanese laid-open patent publication No. 2003-163092).

The stimulable phosphor sheet is a sheet which, when exposed to an applied radiation (X-rays, $\alpha$-rays, $\beta$-rays, $\gamma$-rays, electron beams, ultraviolet radiation, or the like), stores a part of the energy of the radiation, and, when subsequently exposed to applied stimulating light such as visible light, emits light in proportion to the intensity of the stored energy of the radiation.

Since the stimulable phosphor sheet can repeatedly be used by erasing the recorded radiation image information, it is fixedly stored in the radiation image information recording and reading apparatus.

Though the stimulable phosphor sheet can be reused, it needs to be replaced with a new one because its sensitivity varies due to repeated exposures and aging. In addition, the stimulable phosphor sheet may also need to be replaced with a stimulable phosphor sheet having different characteristics depending on the purpose for which an image is to be captured on the stimulable phosphor sheet and the region which is to be imaged.

Inasmuch as the stimulable phosphor sheet is not replaced too frequently in the conventional radiation image information recording and reading apparatus, the stimulable phosphor sheet is normally fastened to a sheet holder in the apparatus by screws. When the stimulable phosphor sheet is to be replaced, the screws are removed to unfasten the stimulable phosphor sheet.

However, when the temperature in the radiation image information recording and reading apparatus varies, components of the sheet holder are expanded or contracted, tending to deform the stimulable phosphor sheet that is held by the sheet holder. As a result, radiation image information may not be recorded on or read from the stimulable phosphor sheet highly accurately.

Another problem is that because the stimulable phosphor sheet is relatively heavy, it may accidentally fall off when the screws are removed, and may possibly be damaged.

SUMMARY OF THE INVENTION

It is a general object of the present invention to provide an image recording medium holding mechanism which is capable of positioning and holding an image recording medium highly accurately and allowing the image recording medium to be removed with ease.

A major object of the present invention to provide an image recording medium holding mechanism which prevents an image recording medium from falling off when the image recording medium is attached to and detached from the image recording medium holding mechanism, and which allows the image recording medium to be attached to and detached from the image recording medium holding mechanism efficiently.

Another object of the present invention to provide an image recording medium holding mechanism which is capable of positioning and holding an image recording medium highly accurately without being affected by temperature variations while the image recording medium is in use.

According to the present invention, holding members engage in respective recesses defined in engaging members fixed to sides of an image recording medium, and are retained in place by resilient members in an image processing apparatus. Even when components of the image processing apparatus are expanded or contracted by temperature changes, since the expansion or contraction is absorbed by displacement of the resilient members and the holding members, the image recording medium is prevented from being deformed.

Limiting members for limiting the deformation of the resilient members are provided to prevent the resilient members from being excessively deformed, allowing the image recording medium to be reliably held on the holding members.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
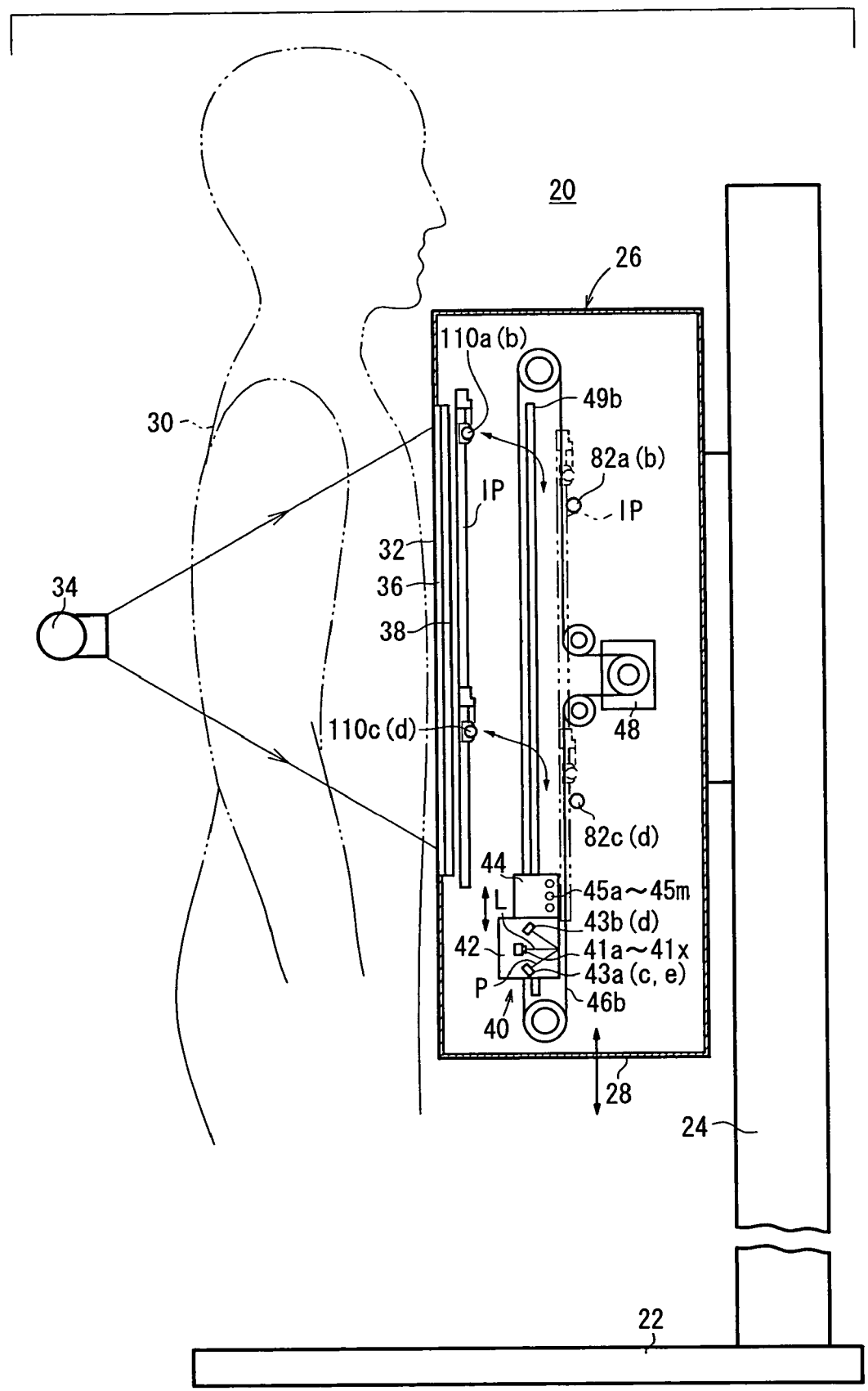
FIG. 1 is a schematic vertical cross-sectional view of a radiation image information recording and reading apparatus incorporating therein an image recording medium holding mechanism according to the present invention.

FIG. 1 schematically shows in vertical cross section a radiation image information recording and reading apparatus 20 incorporating therein an image recording medium holding mechanism according to the present invention. As shown in FIG. 1, the radiation image information recording and reading apparatus 20 has a support post 24 vertically mounted on a support base 22, and a main assembly 26 vertically movably supported on the support post 24.

The main assembly 26 includes a housing 28 having a front panel serving as an exposure base 32 against which a subject 30 is positioned. On the exposure base 32, there are disposed a phototimer 36 for measuring an X-ray dosage that is applied from a radiation source 34 through the subject 34 and controlling the amount of the applied X-ray radiation, and a grid 38 for removing scattered radiation.

A stimulable phosphor sheet IP is disposed in the main assembly 26 for movement between an image recording position (indicated by the solid lines) close to the exposure base 32 and an image reading position (indicated by the two-dot-and-dash lines) spaced from the exposure base 32. The stimulable phosphor sheet IP is a sheet which, when exposed to an applied radiation (X-rays, α-rays, β-rays, γ-rays, electron beams, ultraviolet radiation, or the like), stores a part of the energy of the radiation, and, when subsequently exposed to applied stimulating light such as visible light, emits light in proportion to the intensity of the stored energy of the radiation.

The main assembly 26 includes a reading/erasing unit 40 which is vertically movable along the front face of the stimulable phosphor sheet IP that is disposed in the two-dot-and-dash-line image reading position. The reading/erasing unit 40 comprises a reader 42 for applying stimulating light L to the stimulable phosphor sheet IP and photoelectrically reading light P emitted from the stimulable phosphor sheet IP depending on the intensity of radiation energy that is stored in the stimulable phosphor sheet IP, and an eraser 44 for applying erasing light to the stimulable phosphor sheet IP from which the radiation image information has been read to remove any remaining radiation energy from the stimulable phosphor sheet IP.

The reader 42 comprises a plurality of laser diodes 41a through 41x for outputting the stimulating light L and a plurality of CCD line sensors 43a through 43e for converting the light L emitted from the stimulable phosphor sheet IP into an electric signal. The eraser 44 has a plurality of cold-cathode tubes 45a through 45m for outputting the erasing light.

The reading/erasing unit 40 is elongate in a direction (main direction) perpendicular to the direction (auxiliary direction) indicated by the arrows in FIG. 1. The laser diodes 41a through 41x of the reader 42 are arrayed at certain spaced intervals in the longitudinal direction of the reader 42 for applying a line of stimulating light L to the reader 42. Of the CCD line sensors 43a through 43e, three CCD line sensors 43a, 43c, 43e are disposed above the laser diodes 41a through 41x and two CCD line sensors 43b, 43d are disposed below the laser diodes 41a through 41x in staggered relation to each other.

Figure 2:
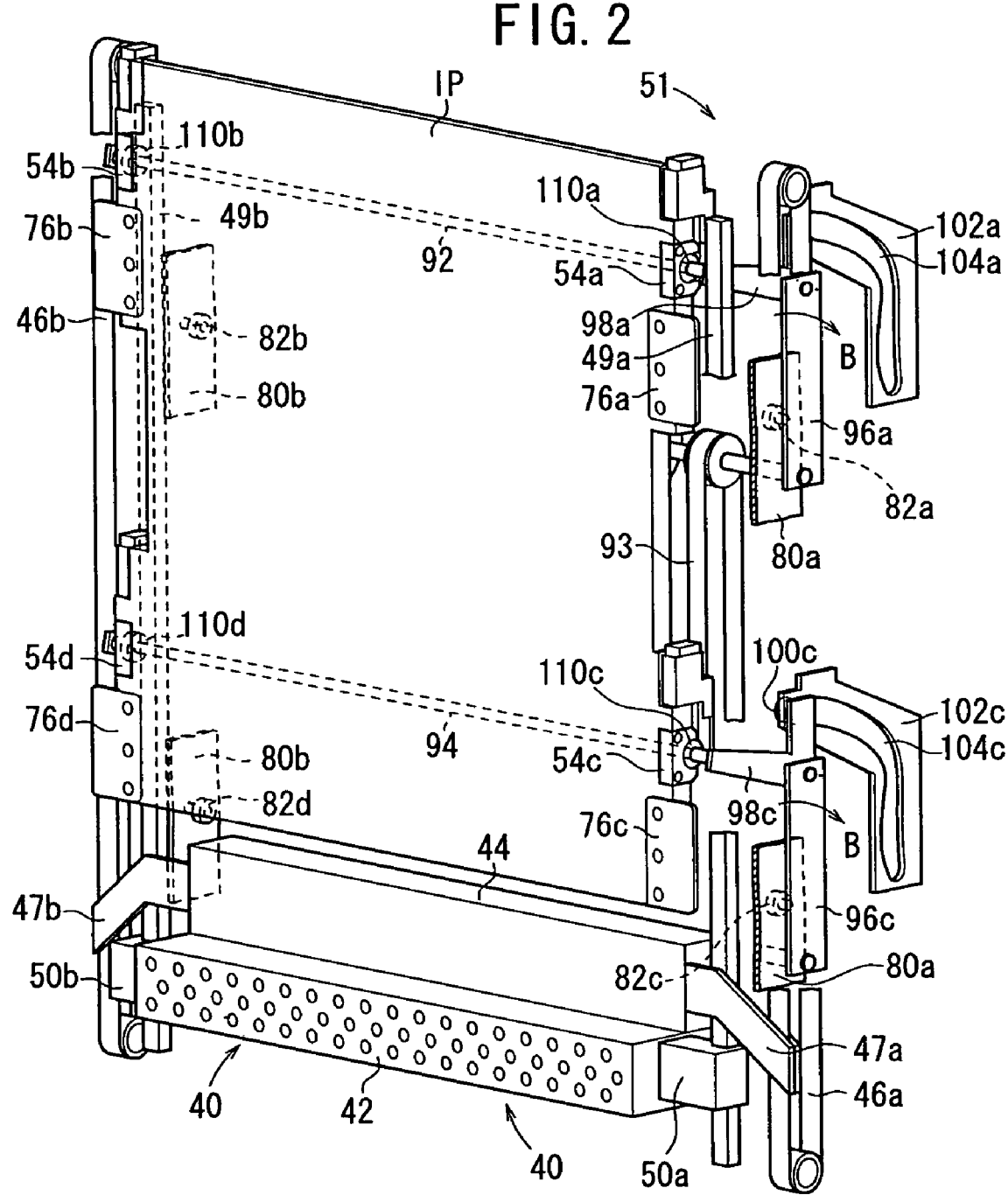
FIG. 2 is a perspective view of a stimulable phosphor sheet disposed in an image recording position in the radiation image information recording and reading apparatus shown in FIG. 1.
Figure 3:
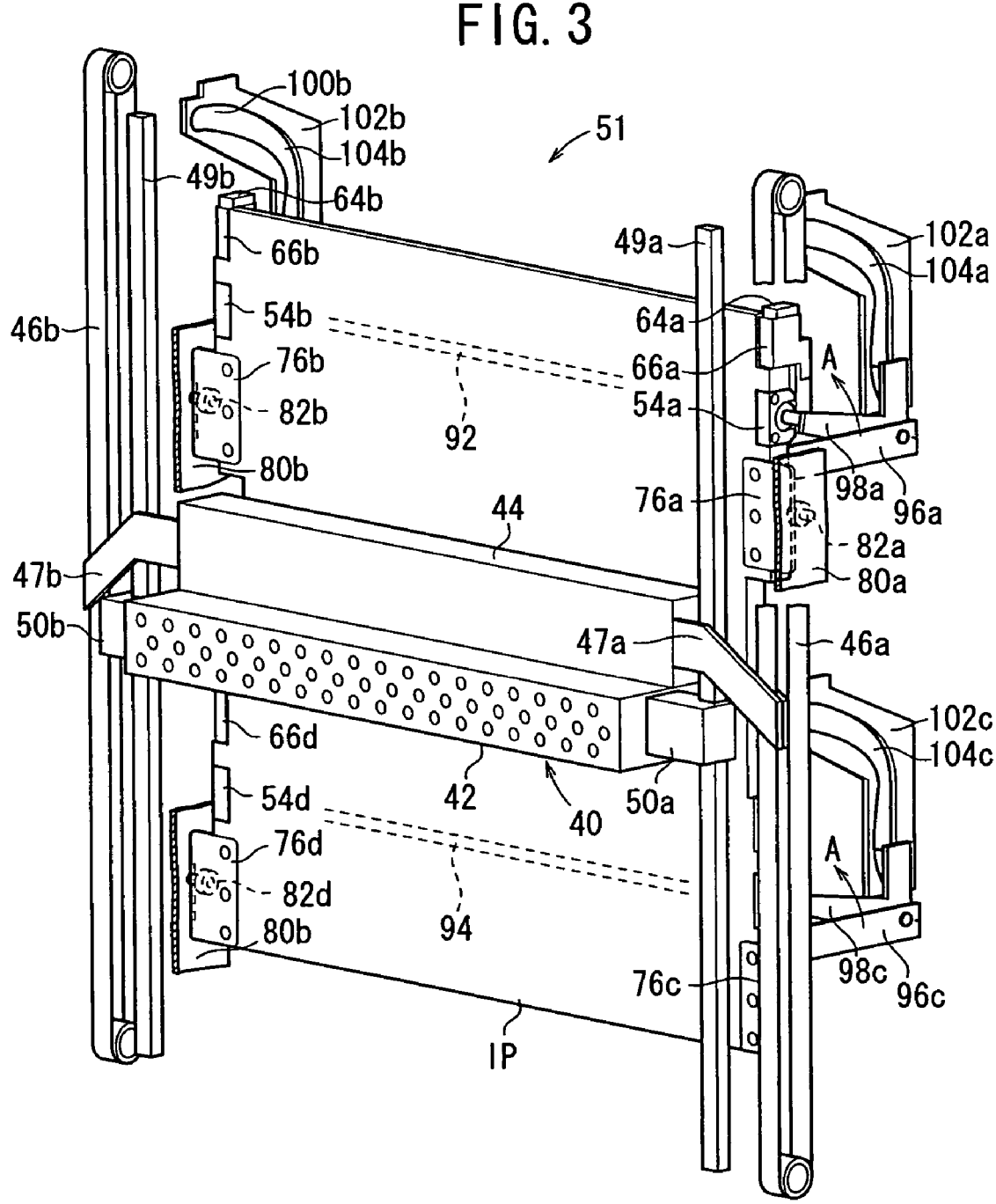
FIG. 3 is a perspective view of the stimulable phosphor sheet disposed in an image reading position in the radiation image information recording and reading apparatus shown in FIG. 1.

FIG. 2 shows the stimulable phosphor sheet IP disposed in the image recording position indicated by solid lines in FIG. 1, and FIG. 3 shows the stimulable phosphor sheet IP disposed in the image reading position indicated by the two-dot-and-dash lines in FIG. 1. As shown in FIGS. 2 and 3, brackets 50a, 50b are mounted respectively on the longitudinally opposite ends of the reader 42 and held in engagement with respective guide rails 49a, 49b that extent vertically along the opposite sides of the stimulable phosphor sheet IP. Feed belts 46a, 46b disposed along the respective guide rails 49a, 49b engaged respectively by brackets 47a, 47b that are disposed on both sides of the eraser 47. The feed belts 46a, 46b are actuatable by a reading/erasing unit moving motor 48 (see FIG. 1) which is disposed substantially centrally in the main assembly 26. When actuated, the feed belts 46a, 46b move the reading/erasing unit 40 vertically along the guide rails 49a, 49b.

Figure 4:
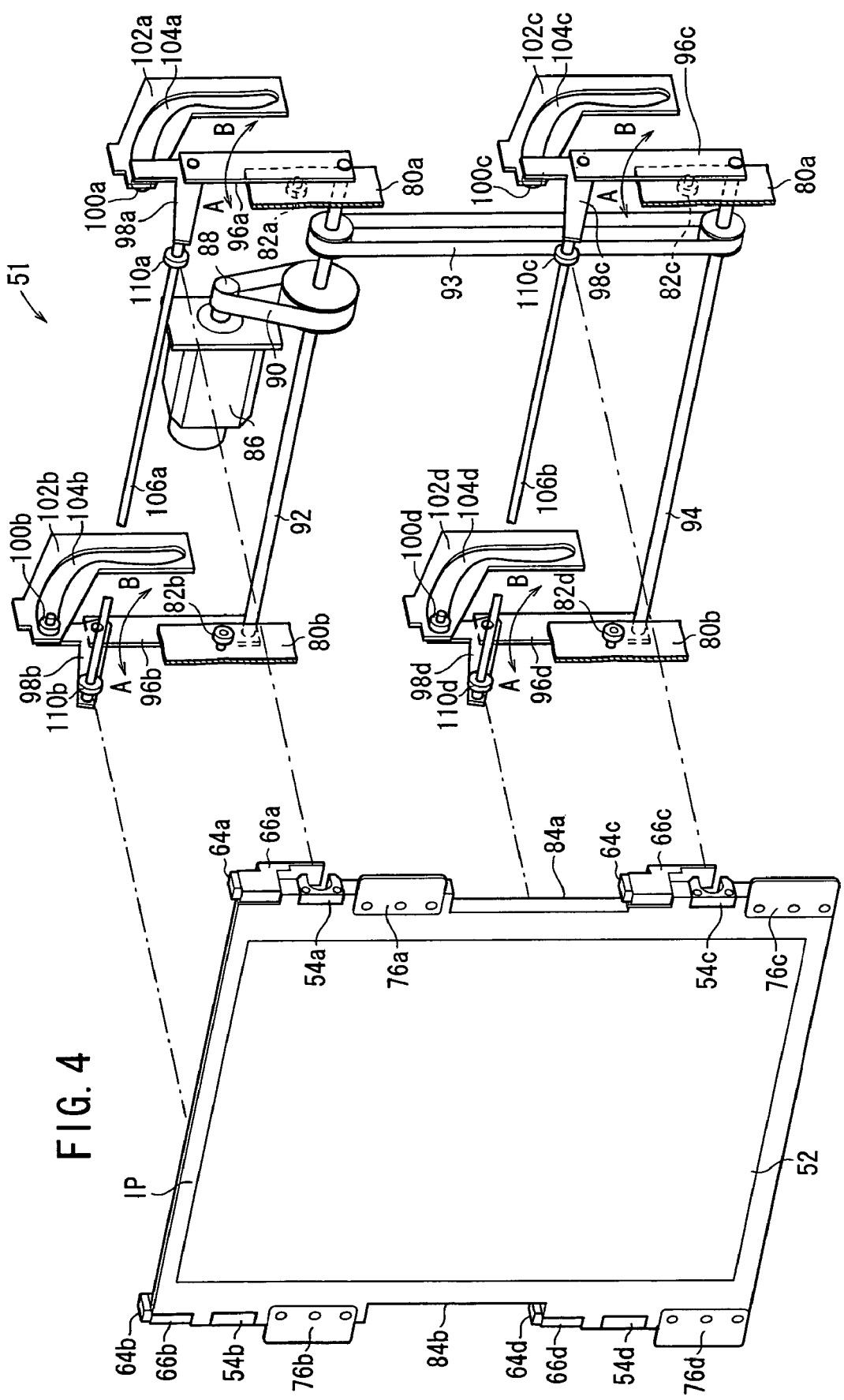
FIG. 4 is a perspective view of the stimulable phosphor sheet and a moving mechanism for the stimulable phosphor sheet in the radiation image information recording and reading apparatus shown in FIG. 1.
Figure 5:
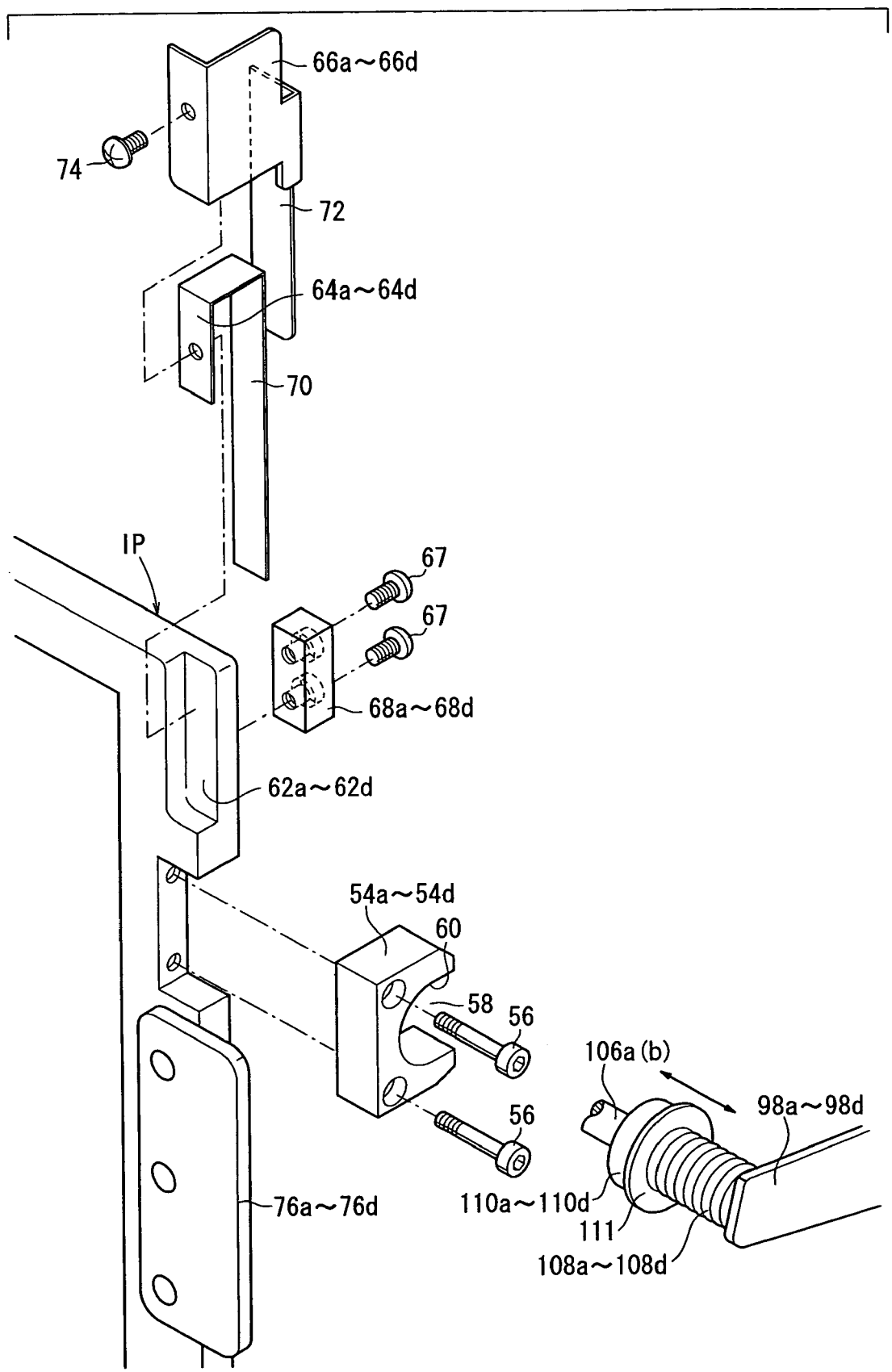
FIG. 5 is an exploded perspective view of a holding mechanism for holding the stimulable phosphor sheet in the radiation image information recording and reading apparatus shown in FIG. 1.

FIG. 4 shows the stimulable phosphor sheet IP and a moving mechanism 51 for moving the stimulable phosphor sheet IP. FIG. 5 shows in exploded perspective a holding mechanism for holding the stimulable phosphor sheet IP in the moving mechanism 51.

As shown in FIG. 4, the stimulable phosphor sheet IP is a rectangular sheet stored in an upstanding state in the main assembly 26. The stimulable phosphor sheet IP has an image recording surface 52 with a stimulable phosphor layer disposed thereon. The holding mechanism has engaging members 54a through 54d fastened to upper and lower opposite sides of the stimulable phosphor sheet IP by screws 56 (see FIG. 5). The engaging members 54a through 54d have semicircular recesses 60 defined therein which have respective openings 58 in their sides facing away from the image recording surface 52 of the stimulable phosphor sheet IP.

Figure 6:
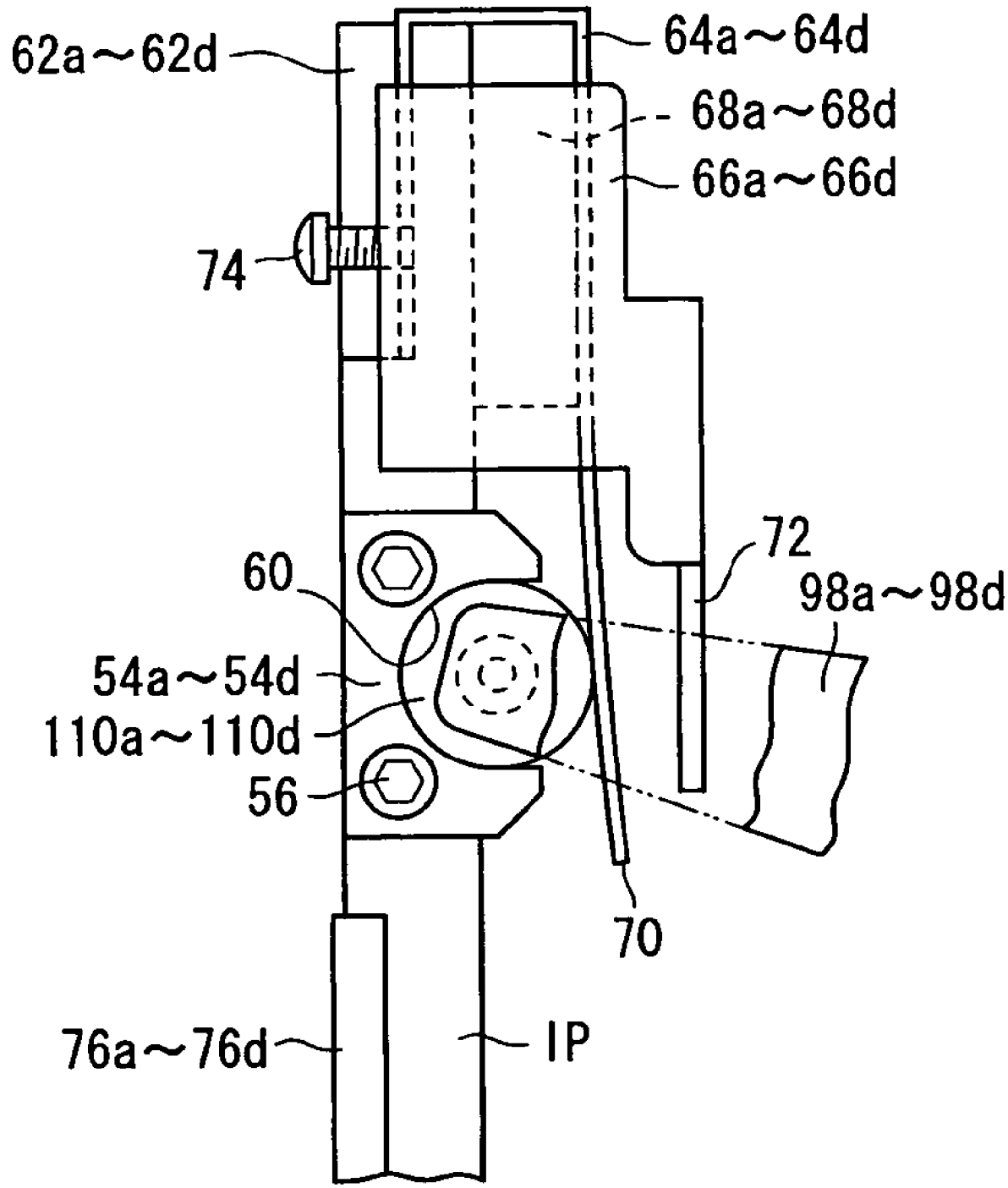
FIG. 6 is a side elevational view showing the stimulable phosphor sheet which is held by the holding mechanism in the recording position in the radiation image information recording and reading apparatus shown in FIG. 1.

The stimulable phosphor sheet IP has steps 62a through 62d on its upper and lower opposite sides above the respective engaging members 54a through 54d. Leaf springs 64a through 64d (resilient members) and leaf spring holders 66a through 66d are fastened to the respective steps 62a through 62d by screws 67 that are threaded in spacers 68a through 68d which are fixed to the stimulable phosphor sheet IP. The leaf springs 64a through 64d have respective pressers 70 extending downwardly therefrom. When the leaf springs 64a through 64d are fastened to the respective steps 62a through 62d as shown in FIG. 6, the pressers 70 close the openings 58 of the recesses 60 in the engaging members 54a through 54d. As shown in FIG. 6, the leaf spring holders 66a through 66d have limiting plates 72 (limiting members) 72 extending downwardly therefrom along the respective pressers 70 of the leaf springs 64a through 64d. The limiting plates 72 serve to limit excessive deformation of the pressers 70. The leaf springs 64a through 64d and the leaf spring holders 66a through 66d are also fastened to the respective steps 62a through 62d by screws 74.

Positioning plates 76a through 76d for positioning the stimulable phosphor sheet IP in the image reading position are fixed to the stimulable phosphor sheet IP beneath the respective engaging members 54a through 54d. As shown in FIG. 4, when the positioning plates 76a through 76d abut against respective positioning rollers 82a through 82d mounted on frames 80a, 80b of the main assembly 26, the positioning plates 76a through 76d position the stimulable phosphor sheet IP in the image reading position. The stimulable phosphor sheet IP has recesses 84a, 84b defined respectively in centrally opposite sides for the operator to grip the stimulable phosphor sheet IP at those recesses 84a, 84b.

The moving mechanism 51 for moving the stimulable phosphor sheet IP has an IP moving motor 86. The IP moving motor 86 has a drive shaft 88 operatively connected by a belt 90 to an upper driven shaft 92 which is in turn operatively connected by a belt 93 to a lower driven shaft 94. Drive plates 96a through 96d have lower ends fixed respectively to the opposite ends of the upper drive shaft 92 and the lower driven shaft 94. L-shaped links 98a through 98d have intermediate portions pivotally supported on respective upper ends of the drive plates 96a through 96d.

Cam rollers 100a through 100d are rotatably supported on respective ends of the links 98a through 98d. The cam rollers 100a through 100d engage in respective cam grooves 104a through 104d which are defined in respective guide plates 102a through 102d and curved from the upper end toward lower end of the main assembly 26. The other ends of the links 98a, 98b and the other ends of the links 98c, 98d are interconnected by support shafts 106a, 106b which support the back of the stimulable phosphor sheet IP. Bearing members 110a through 110d (holding members) are mounted respectively on the opposite ends of the support shafts 106a, 106b. The bearing members 110a through 110d are displaceable in the directions indicated by the arrows in FIG. 5 with springs 108a through 108d interposed between the bearing members 110a through 110d and the links 98a through 98d. The bearing members 110a through 110d have respective flanges 111 on their ends, and are held in engagement with the respective engaging members 54a through 54d on the stimulable phosphor sheet IP. The bearing members 110a through 100d which engage the engaging members 54a through 54d are held respectively in the engaging members 54a through 54d by the holders 70 of the leaf springs 64a through 64d, thereby connecting the stimulable phosphor sheet IP to the moving mechanism 51.

The radiation image information recording and reading apparatus 20 according to the present embodiment is basically constructed as described above. Operation and advantages of the radiation image information recording and reading apparatus 20 will be described below.

First, a process of recording radiation image information of the stimulable phosphor sheet IP will be described below. The reading/erasing unit 40 waits in a lowermost position shown in FIG. 1, and the stimulable phosphor sheet IP is moved to the image recording position shown in FIG. 2 by the moving mechanism 51.

When the IP moving motor 86 is energized, it causes the belts 90, 93 to rotate the upper drive shaft 92 and the lower driven shaft 94 about their own axes, turning the drive plates 96a through 96d with their ends fixed to the opposite ends of the shafts 92, 94 in the direction indicated by the arrow A in FIG. 3. When the drive plates 96a through 96d are turned, the cam rollers 100a through 100d on the links 98a through 98d pivotally supported on the other ends of the drive plates 96a through 96d move along the cam grooves 104a through 104d in the guide plates 102a through 102d. Therefore, the bearing members 110a through 110d coupled to the links 98a through 98d are moved toward the exposure base 32. Since the bearing members 110a through 110d engage in the respective recesses 60 in the engaging members 54a through 54d fixed to the stimulable phosphor sheet IP, as shown in FIG. 6, the bearing members 110a through 110d move the stimulable phosphor sheet IP to the image recording position shown in FIG. 2.

After the stimulable phosphor sheet IP is placed in the image recording position, radiation image information starts being recorded on the stimulable phosphor sheet IP.

Depending on a region of the subject 30 which is to be imaged, the main assembly 26 is vertically moved along the support post 24. After the main assembly 26 is positioned, the radiation source 34 is energized to apply X-rays to the subject 30. The X-rays that have passed through the subject 30 are applied via the phototimer 36 and the grid 38 to the stimulable phosphor sheet IP, recording radiation image information of the subject 30 on the stimulable phosphor sheet IP.

As shown in FIG. 6, the bearing members 110a through 110d engage the respective engaging members 54a through 54d and are held by the pressers 70 of the leaf springs 64a through 64d. The pressers 70 merely press the bearing members 110a through 110d against the engaging members 54a through 54d under their own resiliency, and the bearing members 110a through 110d are movable axially of the support shafts 106a, 106b by the springs 108a through 108d. Therefore, even when the stimulable phosphor sheet IP and the components of the moving mechanism 51 are expanded or contracted due to temperature changes, since the engaging members 54a through 54d are not rigidly fixed to the bearing members 110a through 110d, the image recording surface 52 of the stimulable phosphor sheet IP is prevented from being deformed to lower its planarity. As a result, the radiation image information is recorded highly accurately on the stimulable phosphor sheet IP.

If the bearing members 110a through 110d and the engaging members 54a through 54d engaged by the bearing members 110a through 110d are made of an electrically conductive material, then electrostatic charges developed in the stimulable phosphor sheet IP can be discharged from the engaging members 54a through 54d via the bearing members 110a through 110d. Thus, noise due to electrostatic charges is prevented from being introduced into the radiation image information, and hence the radiation image information can be recorded more highly accurately on the stimulable phosphor sheet IP.

After the radiation image information has been recorded on the stimulable phosphor sheet IP, the stimulable phosphor sheet IP is moved from the image recording position to the image reading position shown in FIG. 3 by the moving mechanism 51. Specifically, the IP moving motor 86 is energized to turn the drive plates 96a through 96d in the direction indicated by the arrow B in FIG. 2. The links 98a through 98d are guided by the guide plates 102a through 102d to move the stimulable phosphor sheet IP with the bearing members 110a through 110d to the image reading position.

When the stimulable phosphor sheet IP is moved to the image reading position, the positioning plates 76a through 76d fixed to the opposite sides of the stimulable phosphor sheet IP are brought into abutment against the positioning rollers 82a through 82d, thus positioning the stimulable phosphor sheet IP accurately in the image reading position.

Figure 7:
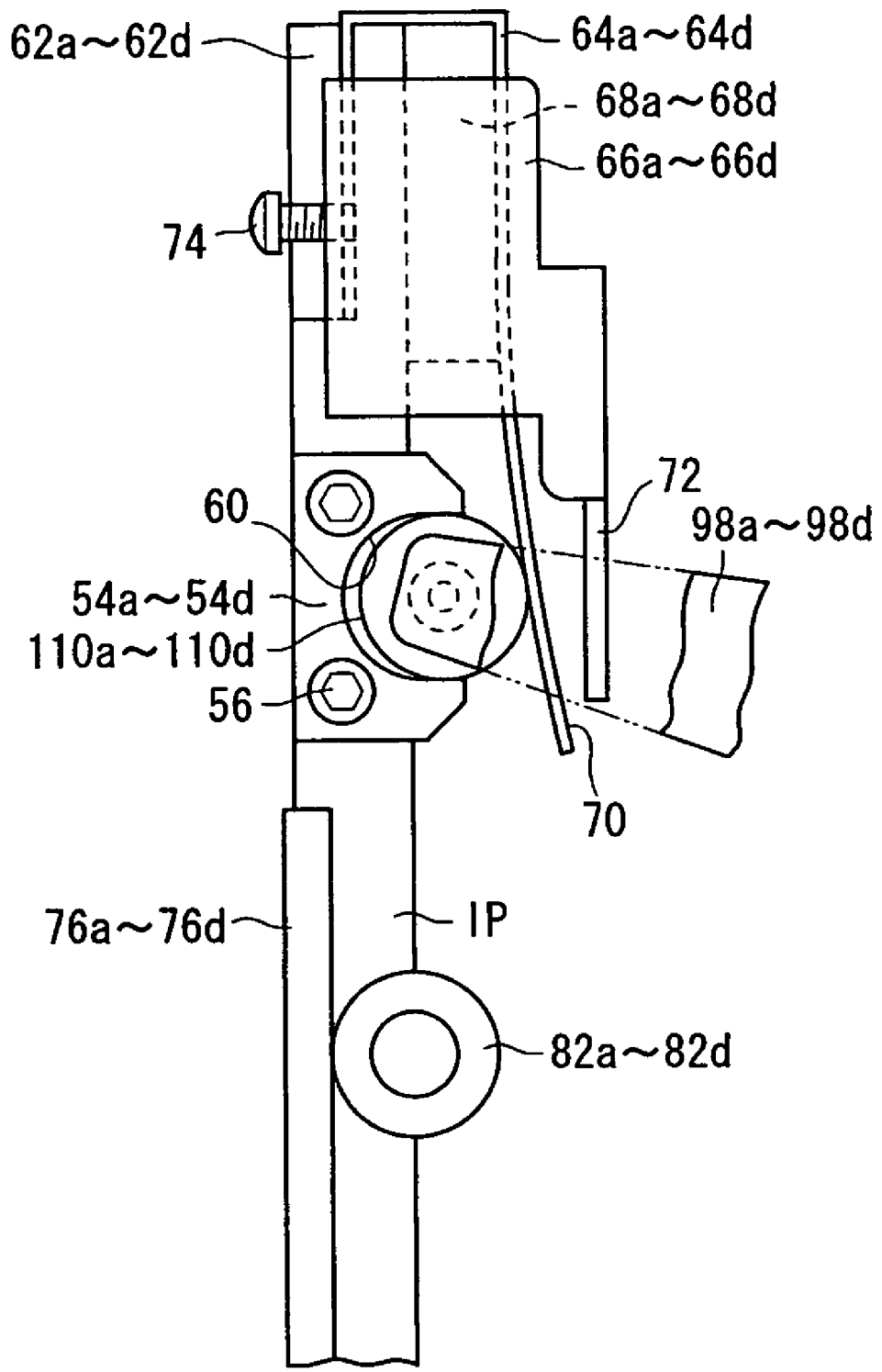
FIG. 7 is a side elevational view showing the stimulable phosphor sheet which is held by the holding mechanism in the reading position in the radiation image information recording and reading apparatus shown in FIG. 1.

It is highly difficult for only the moving mechanism 51 to move the stimulable phosphor sheet IP accurately to the image reading position and position the stimulable phosphor sheet IP accurately in the image reading position. According to the present embodiment, the bearing members 110a through 110d which holds the stimulable phosphor sheet IP are held in the respective engaging members 54a through 54d by the pressers 70 of the leaf springs 64a through 64d. At this time, the bearing members 110a through 110d are displaced slightly more than the positioning rollers 82a through 82d that are disposed in the image reading position. As shown in FIG. 7, the bearing members 110a through 110d are displaced within the engaging members 54a through 54d, thereby elastically deforming the pressers 70. Since the positioning plates 76a through 76d abut against the positioning rollers 82a through 82d, the stimulable phosphor sheet IP is not deformed by the displacement of the bearing members 110a through 110d, but is accurately positioned in the image reading position that is determined by the positioning rollers 82*a* through 82*d*.

After the stimulable phosphor sheet IP has accurately been placed in the image reading position, the reading/erasing unit moving motor 48 is energized to cause the feed belts 46*a*, 46*b* to elevate the reading/erasing unit 40, which starts to read the radiation image information recorded on the stimulable phosphor sheet IP.

The line of stimulating light L emitted from the laser diodes 41*a* through 41*x* of the reader 42 is applied to the stimulable phosphor sheet IP, which emits light P in proportion to the radiation energy that is stored in the stimulable phosphor sheet IP. The emitted light P is led and applied to the CCD line sensors 43*a* through 43*e*, which convert the applied light P into an electric signal. The electric signal is then processed and transmitted to an image processing apparatus (not shown). The reader 42 is lifted along the guide rails 49*a*, 49*b* to scan the stimulable phosphor sheet IP for thereby two-dimensionally read the radiation image information recorded on the entire image recording surface 52 of the stimulable phosphor sheet IP.

At this time, the stimulable phosphor sheet IP is held in position without deformation by the bearing members 110*a* through 110*d* pressed by the pressers 70 of the leaf springs 64*a* through 64*d*, and is also positioned accurately in the image reading position by the positioning plates 76*a* through 76*d*. Therefore, the recorded radiation image information can highly accurately be read from the stimulable phosphor sheet IP.

When the reading/erasing unit 40 is moved to the uppermost position, the reading of the radiation image information from the stimulable phosphor sheet IP by the reader 42 is completed. Thereafter, the reading/erasing unit 40 starts descending, and the eraser 44 performs its erasing process. Specifically, the eraser 44 applies erasing light emitted from the cold-cathode tubes 45*a* through 45*m* to the stimulable phosphor sheet IP. Upon exposure to the erasing light, the stimulable phosphor sheet IP discharges remaining radiation energy stored therein. The eraser 44 keeps erasing remaining radiation energy from the stimulable phosphor sheet IP until the reading/erasing unit 40 is moved to the lowermost position, thereby completing the process of erasing remaining radiation energy from the entire image recording surface 52 of the stimulable phosphor sheet IP.

Figure 8:
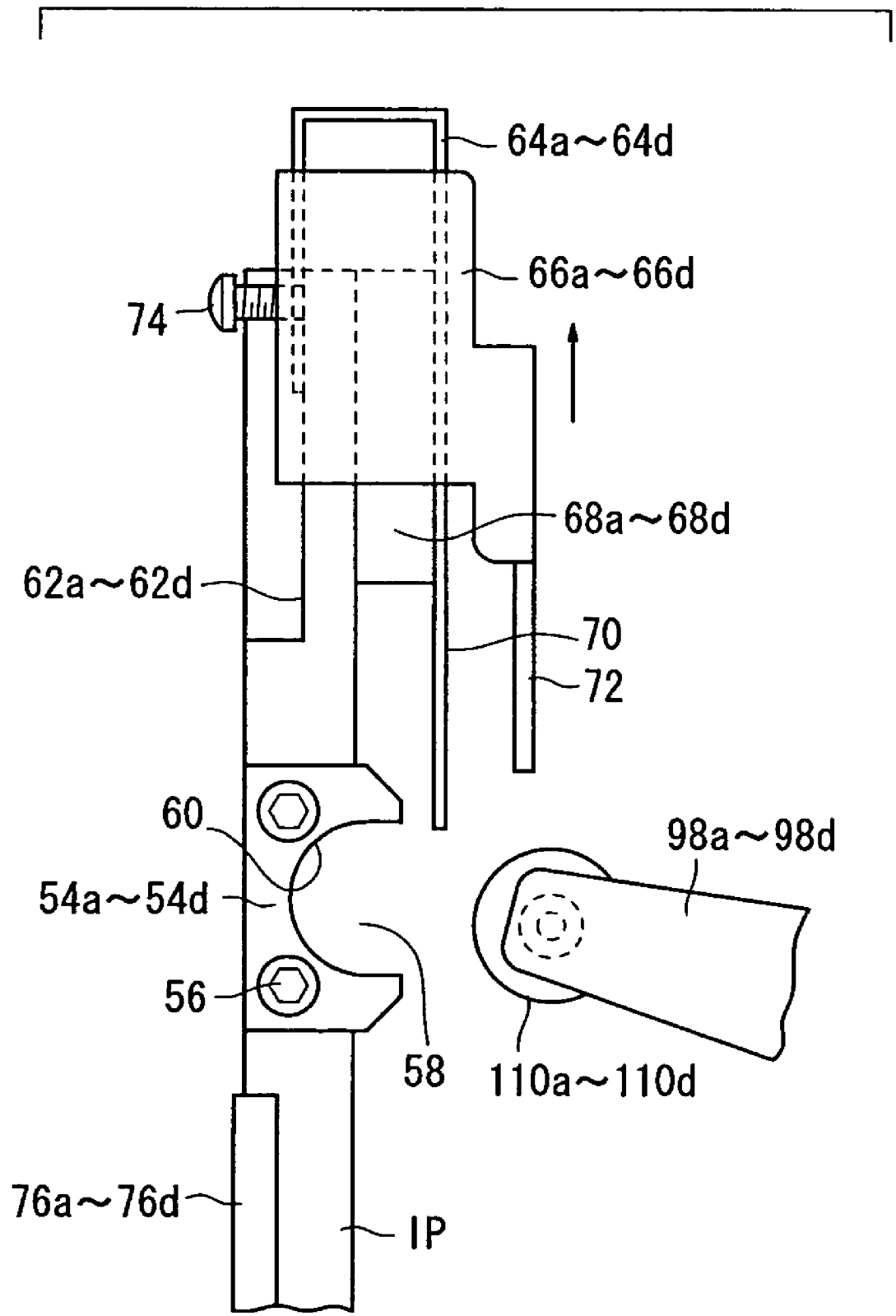
FIG. 8 is a side elevational view showing the stimulable phosphor sheet which is released from the holding mechanism in the radiation image information recording and reading apparatus shown in FIG. 1.

The stimulable phosphor sheet IP is replaced as follows:

The reading/erasing unit 40 is retracted to the lowermost position shown in FIG. 2, and then the stimulable phosphor sheet IP is moved to the image recording position. The screws 74 by which the leaf springs 64*a* through 64*d* and the leaf spring holders 66*a* through 66*d* are fastened to the stimulable phosphor sheet IP are loosened, and the leaf springs 64*a* through 64*d* and the leaf spring holders 66*a* through 66*d* are moved upwardly from the position shown in FIG. 6. The pressers 70 of the leaf springs 64*a* through 64*d* are released from the bearing members 110*a* through 110*d*. As shown in FIG. 8, the stimulable phosphor sheet IP can now be removed from the bearing members 110*a* through 110*d* of the holding mechanism.

When the leaf springs 64*a* through 64*d* and the leaf spring holders 66*a* through 66*d* are simply moved upwardly, the stimulable phosphor sheet IP remains held by the bearing members 110*a* through 110*d* because the bearing members 110*a* through 110*d* still engage in the respective recesses 60 in the engaging members 54*a* through 54*d*. Therefore, the stimulable phosphor sheet IP is prevented from accidentally falling off, and the operator can remove the stimulable phosphor sheet IP safely.

A new stimulable phosphor sheet IP can be installed on the moving mechanism 51 easily according to a process which is essentially the reversal of the removing process. Specifically, in FIG. 4, the engaging members 54*a*, 54*c* disposed on one side of the stimulable phosphor sheet IP are brought into engagement with the bearing members 110*a*, 110*c*, and pressed against the flanges 111 (see FIG. 5), displacing the bearings 110*a*, 110*c* toward the links 98*a*, 98*c* against the bias of the springs 108*a*, 108*c*. Thereafter, the engaging members 54*b*, 54*d* disposed on the other side of the stimulable phosphor sheet IP are brought into engagement with the bearing members 110*b*, 110*c*. In this manner, the stimulable phosphor sheet IP is mounted on the moving mechanism 51. Then, the leaf spring holders 66*a* through 66*d* and the leaf springs 64*a* through 64*d* are lowered and fastened to the stimulable phosphor sheet IP by the screws 74. The stimulable phosphor sheet IP is now firmly coupled to the moving mechanism 51.

Although a certain preferred embodiment of the present invention has been shown and described in detail, it should be understood that various changes and modifications may be made therein without departing from the scope of the appended claims.

What is claimed is:

1. A holding mechanism for holding an image recording medium which is to be removably stored in an image processing apparatus, comprising:

engaging members fixed to sides of said image recording medium and having respective recesses;

holding members for engaging in said recesses through openings of the recesses to hold said image recording medium with respect to said image processing apparatus; and resilient members movable between a closing position in which said resilient members close said openings and an opening position in which said resilient members open said openings;

the arrangement being such that said holding members are retained in said recesses under the resiliency of said resilient members which are disposed in said closing position.

2. A holding mechanism according to claim 1, further comprising limiting members for limiting deformation of said resilient members when said holding members retained in said recesses are displaced.

3. A holding mechanism according to claim 1, wherein said recesses are of a semicircular shape having horizontal surfaces, said image recording medium being vertically suspended by said holding members which engage said horizontal surfaces.

4. A holding mechanism according to claim 1, further comprising a moving mechanism for moving said image recording medium, said holding members comprising bearing members coupled to said moving mechanism while engaging in said recesses and rotatable with respect to said recesses when said image recording medium is moved by said moving mechanism.

5. A holding mechanism according to claim 4, wherein said bearing members are held by said moving mechanism and displaceable by springs.

6. A holding mechanism according to claim 1, further comprising a moving mechanism for moving said image recording medium, said holding members being coupled to said moving mechanism while engaging in said recesses, said image recording medium having positioning plates which are positioned by abutment against positioning rollers when said image recording medium is moved a predetermined distance by said moving mechanism.

7. A holding mechanism according to claim 1, wherein said resilient members are fastened to said image recording medium by screws.

8. A holding mechanism according to claim 1, wherein said engaging members and said holding members are made of an electrically conductive material.

* * * * *